(12) United States Patent
Kweon et al.

(10) Patent No.: US 10,003,516 B2
(45) Date of Patent: Jun. 19, 2018

(54) METHOD AND APPARATUS FOR PROCESSING MESSAGES

(71) Applicant: Samsung Electronics Co., Ltd., Gyeonggi-do (KR)

(72) Inventors: Ki Suk Kweon, Gyeonggi-do (KR); Kill Yeon Kim, Gyeonggi-do (KR); Hyeong Jin Kang, Seoul (KR); Yong-Seok Park, Seoul (KR); Young Ki Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 729 days.

(21) Appl. No.: 14/367,811

(22) PCT Filed: Dec. 4, 2012

(86) PCT No.: PCT/KR2012/010419
§ 371 (c)(1),
(2) Date: Jun. 20, 2014

(87) PCT Pub. No.: WO2013/094895
PCT Pub. Date: Jun. 27, 2013

(65) Prior Publication Data
US 2015/0019723 A1    Jan. 15, 2015

(30) Foreign Application Priority Data
Dec. 21, 2011   (KR) .................. 10-2011-0139100

(51) Int. Cl.
*G06F 15/16*   (2006.01)
*H04L 12/26*   (2006.01)
(Continued)

(52) U.S. Cl.
CPC ............ *H04L 43/10* (2013.01); *H04L 43/103* (2013.01); *H04L 67/26* (2013.01); *H04M 1/72547* (2013.01); *H04W 4/12* (2013.01)

(58) Field of Classification Search
CPC ......... H04L 51/04; H04L 51/12; H04L 51/38; H04L 63/029; H04L 65/1069;
(Continued)

(56) References Cited

U.S. PATENT DOCUMENTS 7,188,143 B2 * 3/2007 Szeto .................. H04L 12/581
                                                       707/999.104
8,831,187 B2 * 9/2014 Nishiyama .......... H04M 3/5307
                                                          379/88.18
(Continued)

FOREIGN PATENT DOCUMENTS

| KR | 10-2004-0045803 | 6/2004 |
| KR | 10-2006-0108474 | 10/2006 |

(Continued)

OTHER PUBLICATIONS

International Search Report dated Feb. 28, 2013 in connection with International Patent Application No. PCT/KR2012/010419, 5 pages.
(Continued)

*Primary Examiner* — Zarni Maung (57) ABSTRACT

The present disclosure relates to a method and apparatus for processing messages. The terminal message processing method According to one embodiment of the present disclosure, the method for processing terminal messages used by the apparatus for processing terminal messages can include the steps of: receiving a message from an application of the terminal; determining whether the message is from a pre-registered registration application; when the message is from the registration application, determining whether the message is a control message; and when the message is not from the registration application, transmitting the message
(Continued)

to a device for processing server messages. According to one embodiment of the present disclosure, a message processing apparatus and method for reducing the transmission and reception of a control message for an application are provided, and battery consumption is reduced.

6 Claims, 10 Drawing Sheets

(51) Int. Cl.
  *H04W 4/12* (2009.01)
  *H04L 29/08* (2006.01)
  *H04M 1/725* (2006.01)
  *G06F 12/00* (2006.01)

(58) Field of Classification Search
  CPC .......... H04L 63/20; H04L 65/1083; H04L 29/06027; H04L 29/125; H04L 29/12528; H04L 29/12537; H04L 61/2564; H04L 61/2575; H04L 61/2578; H04L 65/4007; H04L 65/403
  USPC .......... 709/203, 206–207, 223–229, 250
  See application file for complete search history.

(56) References Cited

U.S. PATENT DOCUMENTS

| | | | |
|---|---|---|---|
| 2005/0251558 A1* | 11/2005 | Zaki | H04L 51/14 709/206 |
| 2014/0194111 A1* | 7/2014 | Aso | H04W 4/001 455/419 |
| 2016/0226948 A1* | 8/2016 | Noguchi | G06F 15/16 |

FOREIGN PATENT DOCUMENTS

| | | |
|---|---|---|
| KR | 10-0724429 | 6/2007 |
| KR | 10-2011-0129731 | 12/2011 |
| WO | WO 2011/093982 | 8/2011 |

OTHER PUBLICATIONS

Written Opinion of International Searching Authority dated Feb. 28, 2013 in connection with International Patent Application No. PCT/KR2012/010419, 5 pages.

\* cited by examiner

METHOD AND APPARATUS FOR PROCESSING MESSAGES

CROSS-REFERENCE TO RELATED APPLICATION(S)

The present application claims priority under 35 U.S.C. § 365 to International Patent Application No. PCT/KR2012/010419 filed Dec. 4, 2012, entitled "METHOD AND APPARATUS FOR PROCESSING MESSAGES". International Patent Application No. PCT/KR2012/010419 claims priority under 35 U.S.C. § 365 and/or 35 U.S.C. § 119(a) to Korean Patent Application No. 10-2011-0139100 filed Dec. 21, 2011, both of which are incorporated herein by reference into the present disclosure as if fully set forth herein.

TECHNICAL FIELD

The present disclosure relates to a message processing method and apparatus and, in particular, to a method and apparatus for processing application messages of a terminal.

BACKGROUND ART

The number of smartphone users is increasing rapidly. As a consequence, the traffic generated by smartphone applications occupies the most part of the entire network traffic. Such traffic includes the messages generated by users and control messages associated with the operations of the applications. The control messages are generated for 24 hours a day at a relatively short interval even when the user does not use the applications.

Recently, various smartphone applications are introduced to the users. Among them, the most popular applications are Social Network Service (SNS), Instant Messenger (IM), and Mail service applications. Examples of the popular applications include kakaotalk, facebook, twitter, mypeople, gmail, etc.

Such applications are classified into one of two categories, i.e. Push service and Pull service types, depending on the network communication mode. According to the push service type, when user data occurs in network, the service initiates connection to send the data to the user in real time. An IM application responsible for communication between users is delay sensitive so as to be implemented in the push service type. In contrast, according to the pull service type, the terminal accesses the server periodically to receive the user data occurred in the network. The social network services are non-delay sensitive so as to be implement in the pull service type.

In order to providing the push service in the cellular network, a Transmission Control Protocol (TCP) session has to be established between the terminal and the application server. The cellular network assigns an internal network address to the network using Network Address Translation (NAT). Accordingly, the server outside the cellular network cannot know the public IP address of the terminal. When user data occurs, it is necessary to establish a TCP connection in order for the server to transmit the data to the terminal. However, since the server located outside the cellular network does not know the IP address of the terminal, it is impossible to establish a TCP session for data transmission. Accordingly, the terminal and the server maintain the TCP session constantly to provide the push service in the cellular network. For this purpose, the terminal sends the server a connection maintenance message or keepalive message periodically.

In the pull service mode, the terminal connects to the server at a predetermined time and/or periodically to check existence of any user update data. If there is any update data, the terminal brings the data from the server. Since the terminal initiates the TCP session in the pull service, there is no need of maintaining the TCP session. However, there is periodic TCP session setup cost of the terminal.

Figure 1:
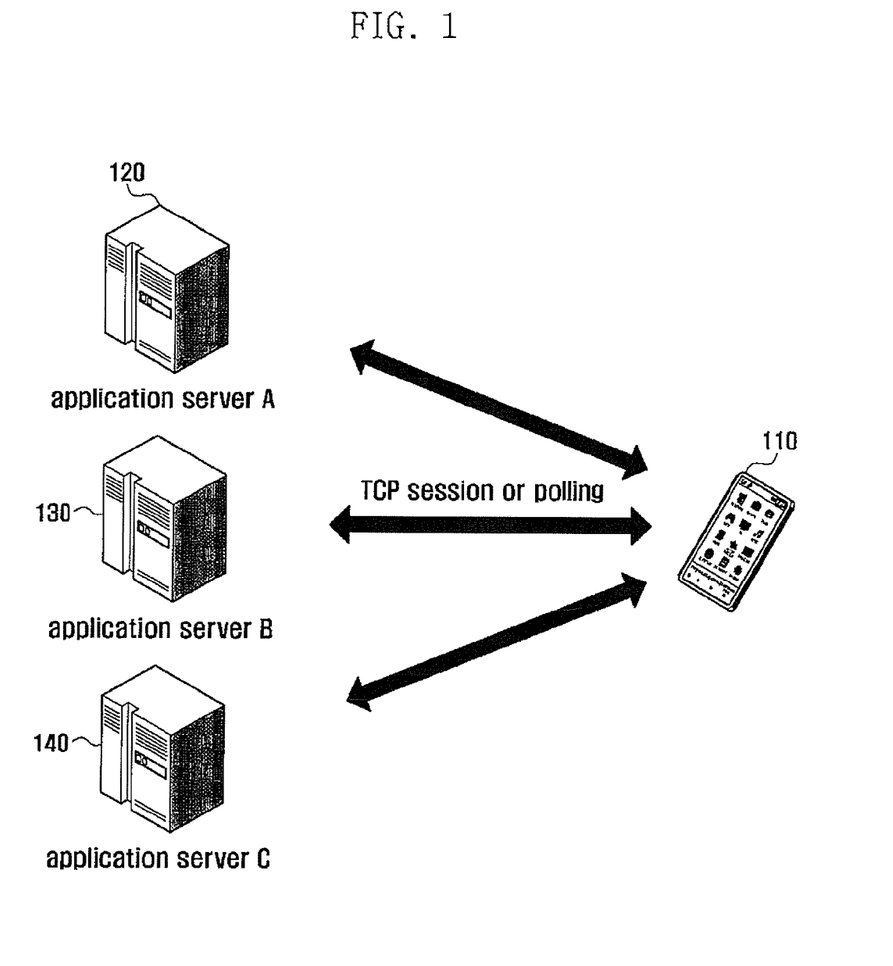
FIG. 1 is a diagram illustrating network architecture for application service according to a conventional method.

FIG. 1 is a diagram illustrating network architecture for application service according to a conventional method.

Referring to FIG. 1, the network includes a terminal 110 and application services 120, 130, and 140 in the conventional method. In any of the push and pull service methods, the terminal 110 generates control messages to the service servers 120, 130, and 140 periodically regardless of application manipulation of the user. Typically, since a plurality of applications installed in the terminal and the smartphone users increases in number, the control messages causes overburden to the cellular network. In the following, the message generated by the user manipulation is referred to as user message, and the message generated periodically independently of the user manipulation is referred to as control message.

In the push service mode, the corresponding applications establish TCP sessions with the respective application server 120, 130, and 140 and exchange Keepalive messages to maintain the sessions. In the pull service mode, the corresponding applications perform periodic polling to the respective application servers 120, 130, and 140. In order to solve this problem, coordination servers such as Android Cloud to Device Messaging (C2DM) server and Apple Push Notification Service (APNS) server have been introduced.

The coordination server such as APNS and C2DM servers makes it possible to substitute one TCP session for the TCP sessions between the terminal and several application servers in the cellular network. For example, the polling-based application which brings user update data periodically is capable of transmitting the control message for polling even when there is no user update.

Another problem is that the applications have to be modified to use the coordination server such as APNS and C2DM servers. The application servers and the applications installed in the terminal have to be provided with the interfaces for communication with the coordination server. This causes the necessity of cooperation with the application manufacturers.

The network provider may be interested in such solutions to reduce the network load. The terminal manufacturer may be interested in such solutions to reduce battery consumption. However, the application manufacturer may be relatively less interested in this problem and thus be uncooperative for solving the problem. There is therefore a need of a method capable of solving this problem without modification of applications.

DISCLOSURE OF INVENTION

Technical Problem

The present disclosure has been proposed to solve the above problem and aims to provide a message processing apparatus and method capable of reducing per-application control message exchanges and battery consumption.

Solution to Problem

In accordance with an aspect of the present disclosure, a terminal message processing method of a terminal message processing apparatus includes receiving a message from an application of a terminal, determining whether the message is generated by a registered application, determining, when the message is generated by the registered application, whether the message is a control message, and transmitting, when the message is the control message, the message to a server message processing apparatus.

In accordance with another aspect of the present disclosure, a terminal message processing apparatus includes an interface unit which receives a message from an application of the terminal, a filter unit which determines whether the message is generated by a registered application and determines, when the message is generated by the registered application, whether the message is a control message, and a message processing unit which transmits, when the message is the control message, the message to a server message processing apparatus.

In accordance with another aspect of the present disclosure, a server message processing method of a server message processing apparatus includes receiving a notification of execution of a predetermined target application from a terminal message processing apparatus, registering, when the execution notification is received, the target application as a registered application, and transmitting a control message to a server corresponding to the registered application periodically.

In accordance with still another aspect of the present disclosure, a server message processing apparatus includes an interface unit which receives a notification of execution of a predetermined target application from a terminal message processing apparatus, a control unit which registers, when the execution notification is received, the target application as a registered application, and a message processing unit which transmits a control message to a server corresponding to the registered application periodically.

Advantageous Effects of Invention

The message processing apparatus and method of the present disclosure is advantageous in terms of reducing per-application control message exchange and battery consumption.

MODE FOR THE INVENTION

Exemplary embodiments of the present disclosure are described with reference to the accompanying drawings in detail.

Detailed description of well-known functions and structures incorporated herein may be omitted to avoid obscuring the subject matter of the present disclosure. This aims to omit unnecessary description so as to make the subject matter of the present disclosure clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

The message processing apparatus and method according to embodiments of the present disclosure are described hereinafter with reference to accompanying drawings.

In the following description, a target application is the application as a target of the message processing procedure of the present disclosure. For example, it may be assumed that the message processing apparatus processes a message of a predetermined application such as facebook and twitter. In this case, the target application is the facebook or twitter. The target application may be selected by the terminal manufacturer, network operator, or software developer.

In the following description, a registered application is the application registered for processing the current message among the target applications. It is necessary to check messages periodically in all the cases that a certain target application is running on the foreground and background and the user configure a target application to provide the push service. In such cases, the message processing apparatus registers the application requiring processing a message as the registered application to handle specially.

Figure 2:
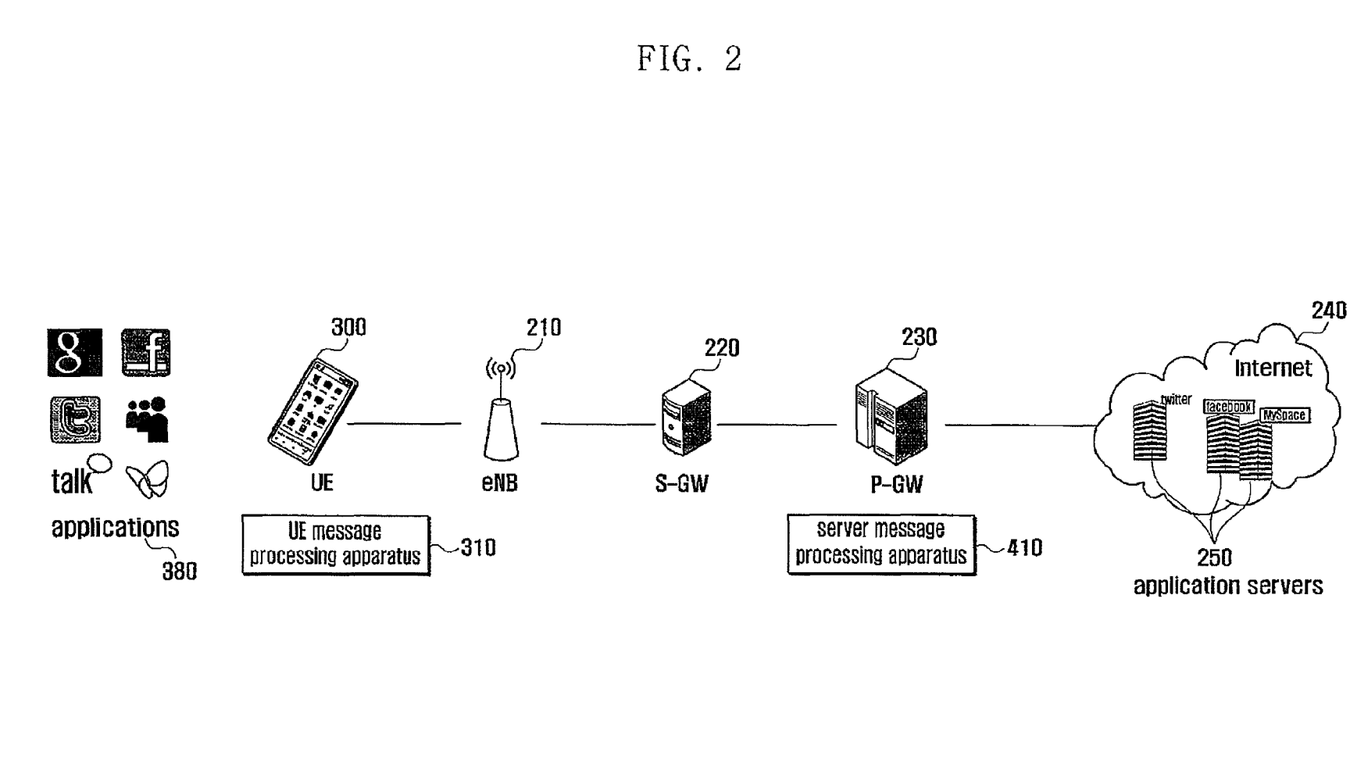
FIG. 2 is a diagram illustrating a configuration of the network according to an embodiment of the present disclosure.

FIG. 2 is a diagram illustrating a configuration of the network according to an embodiment of the present disclosure.

Referring to FIG. 2, the network includes a User Equipment (UE) 300, an evolve Node B (eNB) 210, a Serving Gateway (SGW) 220, a Packet Data Network Gateway (PGW), and Internet 240.

A plurality of applications 380 are installed in the terminal 300. The messages generated by and destined to the applications 380 are processed by the UE message processing apparatus 310. The UE message processing apparatus 310 may be a component of the UE 300. According to an alternative embodiment, the UE message processing apparatus 310 may be an external device attached to the UE 300.

The eNB 210 and SGW 220 are interposed in series between the UE 200 and the PGW 230. The PGW 230 includes a server message processing apparatus 410. The server message processing apparatus 410 processes the messages transmitted by or addressed to the application servers 250. According to an alternative embodiment, the server message processing apparatus 410 may be an external device attached to the PGW 230. The server message processing apparatus 410 may be a part of a component of the cellular network such as eNB 210 and SGW 220 and may be connected to the serving gateway or other cellular network. In the following description, it is assumed that the PGW 230 is included in the server message processing apparatus 410. The UE message processing apparatus 310 and the server message processing apparatus 410 process the messages exchanged between the applications 380 and the application servers 250 appropriately to reduce the traffic in the cellular network. Detailed description thereon is made hereinafter with reference to FIGS. 3 to 10.

Figure 3:
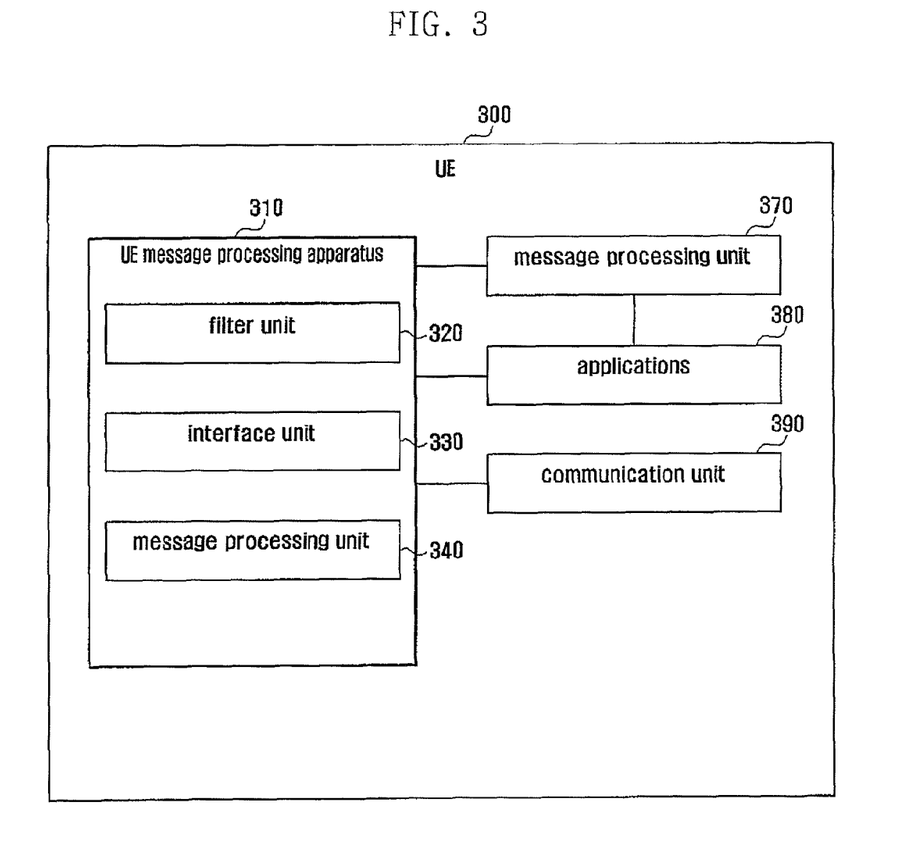
FIG. 3 is a block diagram illustrating a configuration of the UE 300 according to an embodiment of the present disclosure.

FIG. 3 is a block diagram illustrating a configuration of the UE 300 according to an embodiment of the present disclosure.

The UE 300 includes a UE message processing apparatus 310, an application manager 370, applications 380 and a communication unit 390.

The applications 380 provide application functions under the control of the user. For example, the facebook applications may connects to a facebook server to provide the user with the news feed and allow the user to post a new message. The applications 380 may be classified into target applications and other applications. As described above, the target applications may be preset by the UE manufacturer, network operator, and software developer.

The application manager 370 manages the execution states of the applications. Particularly, the application manager 370 monitors the applications execution and termination and push notification setting. If the target application is executed, if the user sets the push notification, if the target application is terminated, or if the user releases the push notification, this is notified to the UE message processing apparatus 310.

The UE message processing apparatus 310 includes a filter unit 320, an interface unit 330, and a message processing unit 340.

The interface unit 330 receives the messages from the applications 380. The interface unit 330 receives the notification on the execution or termination of the target application from the application manager 370.

The execution information is the information of indicating that it is the state of requiring the periodic message check for the application. The execution information may include application execution information and a push notification setting information. For example, it is the state of requiring periodic message check in the case where the application is running on the foreground/background or, although not executed, push notification is configured.

The termination information is the information of indicating that the periodic message check for the application is not required. The termination information may include the information indicating the termination of the application and/or the information indicating the push notification release for the corresponding application. For example, if the application is not running on the foreground/background and if push notification is not configured for the application, there is no need of checking messages periodically.

The filter unit 320 determines whether the received message is the message of a pre-registered application and, if the received message is of the registered application, determines whether the received message is a control message. If the received message is the control message, the filter unit 320 may ignore the message or generates a virtual response message to the corresponding application. If the interface unit 330 receives the execution information on the target application, the filter unit may register the executed target application as a registered application. If the interface unit 330 receives the termination information of the target application, the filter unit 320 may deregister the terminated target application.

If the received message is not a control message, the message processing unit 340 transfers the message to the server message processing apparatus 410. The message processing unit 340 receives the server message from the server message processing apparatus 410 and delivers the server message to the corresponding application 380. If the execution information of the target application is received, the message processing unit 340 may notify the server message processing apparatus 410 of the execution information. If the termination information of the target application is received, the message processing unit 340 may notify the server message processing apparatus 410 of the terminal information.

The communication unit 390 may perform voice and data communications using a radio communication protocol.

Figure 4:
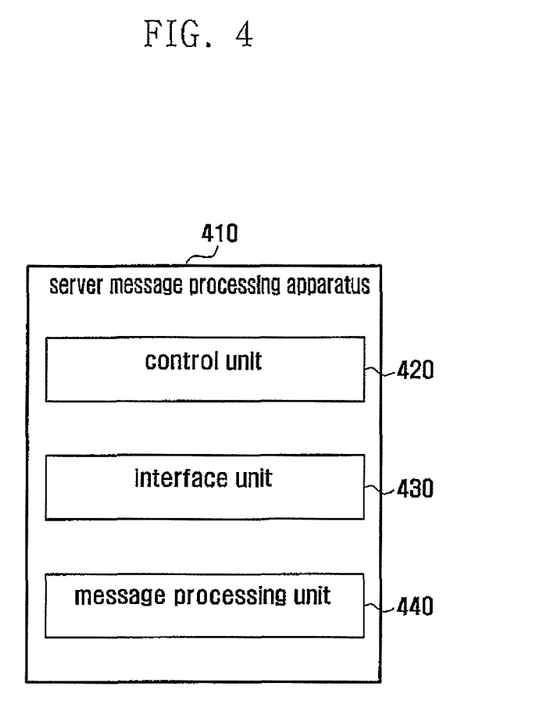
FIG. 4 is a block diagram illustrating a configuration of the server message processing apparatus 410 according to an embodiment of the present disclosure.

FIG. 4 is a block diagram illustrating a configuration of the server message processing apparatus 410 according to an embodiment of the present disclosure.

The server message processing apparatus 410 includes a control unit 420, an interface unit 430, and a message processing unit 440.

The interface unit 430 receives the target application execution information and/or termination information from the UE message processing apparatus 310.

If the interface unit 430 receives the target application execution information, the control unit 420 registers the target application as a registered application. If the interface unit 430 receives the target application termination information, the control unit 420 deregisters the notified target application.

The message processing unit 440 may transmits the connection maintenance message or update check message to the server corresponding to the registered application periodically. The connection maintenance message or the update check message is transmitted periodically such that when there is any update in the application server it can be check immediately. In contrast, the message processing unit 440 does not transmit the message associated with the deregistered application. The message processing unit 440 receives the update message for the registered application from the server and transfers the update message to the UE message processing apparatus 310. If a user message, i.e. user message post command, is received from the UE message processing apparatus 310, the message processing unit 440 transmits the user message to the corresponding server.

The detailed descriptions are made of the UE message processing apparatus 310 and the server message processing apparatus 410 hereinafter in detail with reference to FIGS. 5 to 10.

Figure 5:
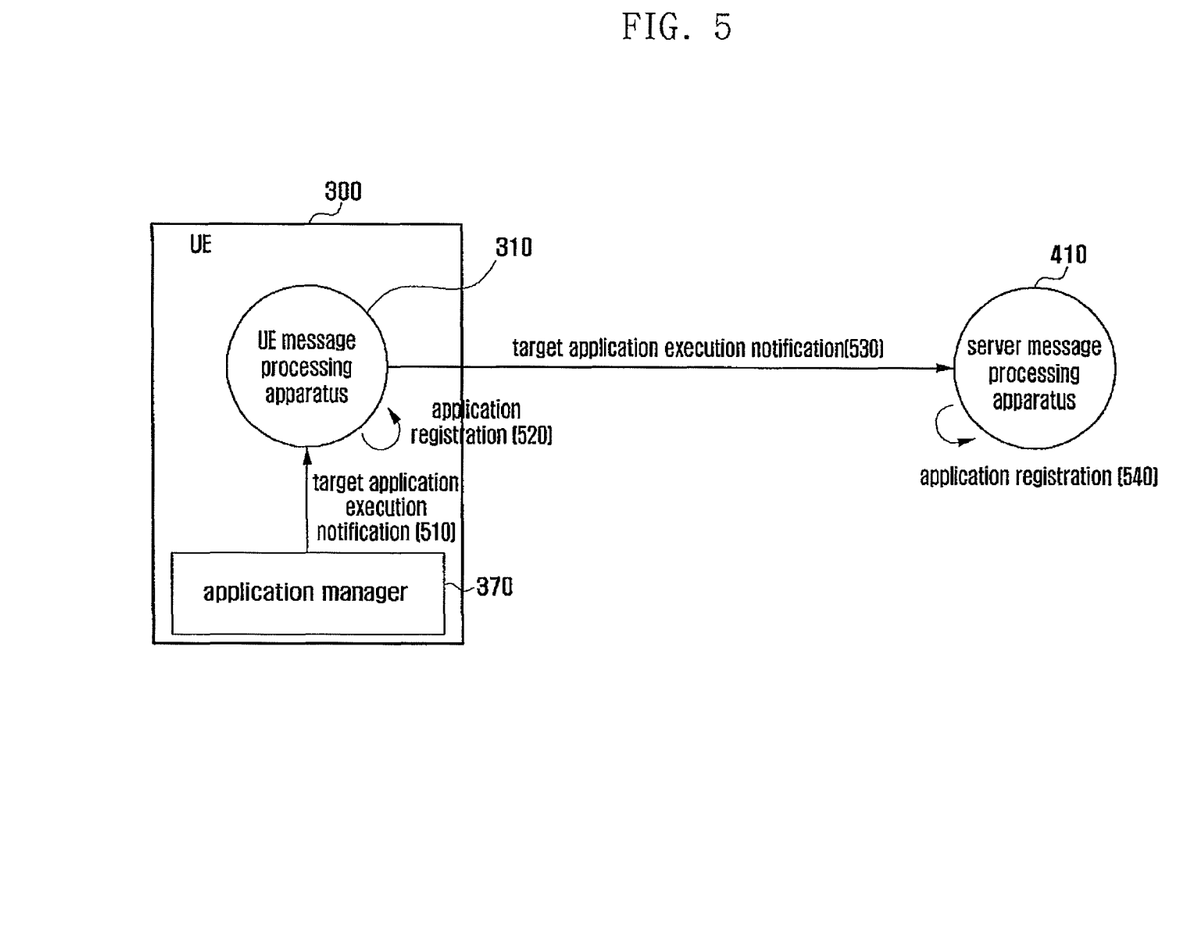
FIG. 5 is a diagram illustrating a target application registration procedure according to an embodiment of the present disclosure.

FIG. 5 is a diagram illustrating a target application registration procedure according to an embodiment of the present disclosure. If the target application is executed or push notification is set for the application, the UE message processing apparatus 310 and the server message processing apparatus 410 registered the target application as a registered application.

The application manager 370 notifies the UE message processing apparatus 310 of the information indicating that the target application has been executed, i.e. indicating that periodic message transmission is required, at operation 510. If the execution of the target application is notified, the UE message processing apparatus 310 registers the target application as the registered application at operation 520. The UE message processing apparatus 310 may register a plurality of target applications. The UE message processing apparatus 310 notifies the server message processing apparatus 410 of the execution of the target application at operation 530. If the target application execution is notified, the server message processing apparatus 410 registers the target application as the registered application. The server message processing apparatus 410 may register a plurality of target applications. The server message processing apparatus 410 may have a set of registered applications per UE.

Figure 6:
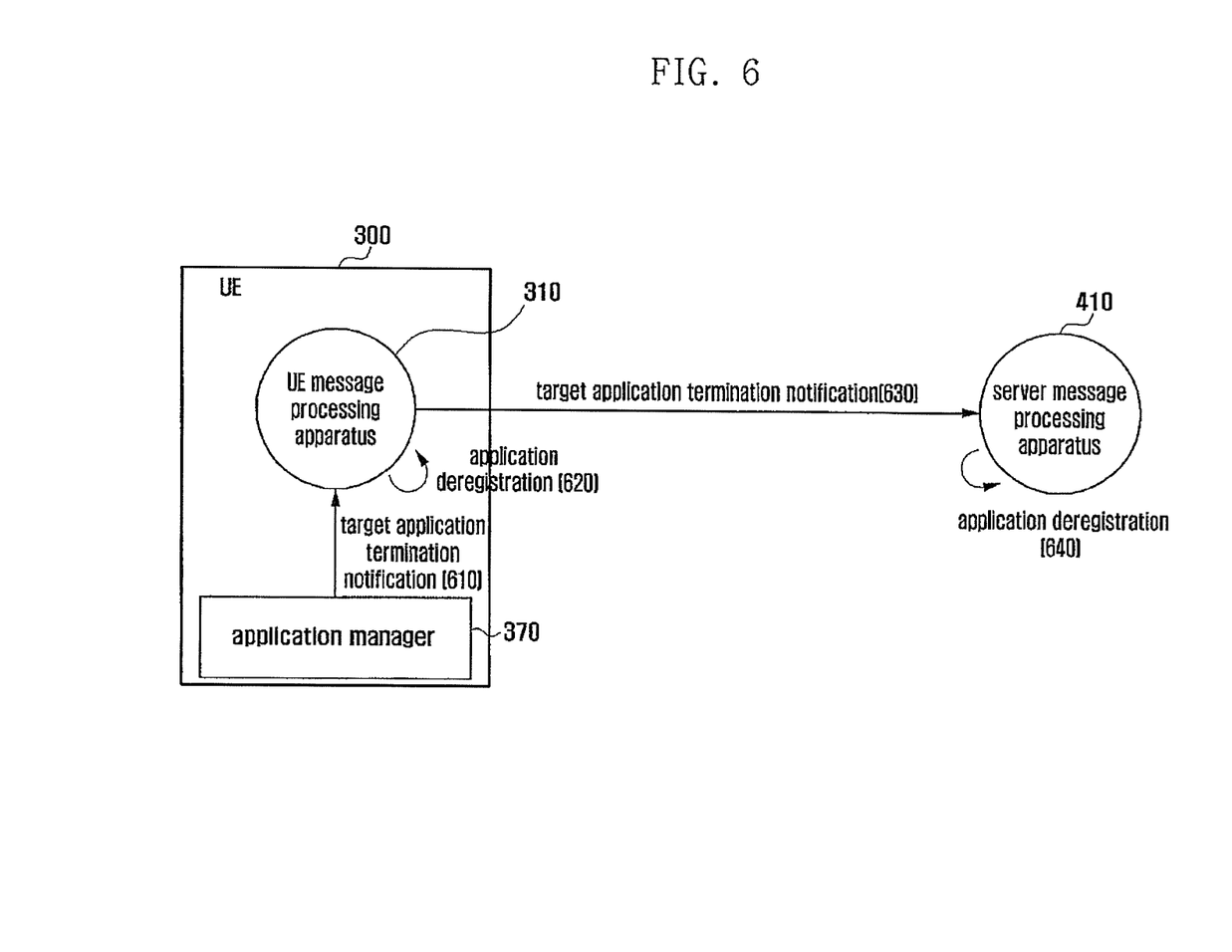
FIG. 6 is a diagram illustrating a target application deregistration procedure according to an embodiment of the present disclosure

FIG. 6 is a diagram illustrating a target application deregistration procedure according to an embodiment of the present disclosure. If the target application is terminated or its push notification is turned off, the UE message processing apparatus 310 and the server message processing apparatus 410 deregisters the registered application.

The application manager 370 notifies the UE message processing apparatus 310 that the target application is terminated, i.e. that the periodic message transmission is not necessary any more, at operation 610. If the target application termination information is received, the terminal message processing apparatus 310 deregisters the registration of the target application at operation 620. The UE message processing apparatus 310 also notifies the server message processing apparatus 410 of the termination of the target application at operation 630. Upon receipt of the target application termination information, the server message processing apparatus 410 deregisters the registration of the target application at operation 640.

The registered application is managed through the procedures of FIGS. 5 and 6. The UE message processing apparatus 310 and the server message processing apparatus 410 may filter through only the messages of the registered applications and processes the message in the procedures of FIGS. 7 to 10.

Figure 7:
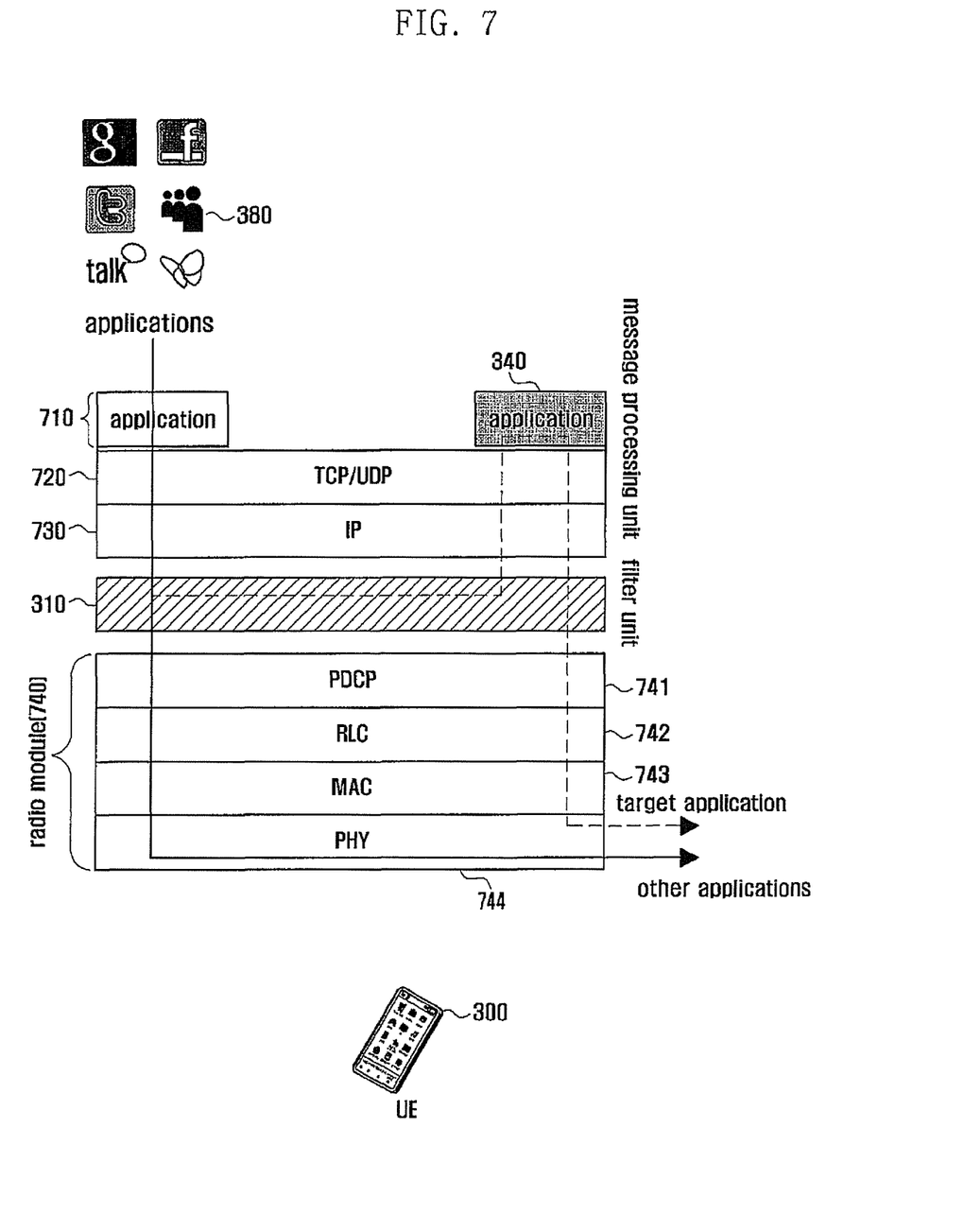
FIG. 7 is a diagram illustrating protocol layers of the UE 300 according to an embodiment of the present disclosure.

FIG. 7 is a diagram illustrating protocol layers of the UE 300 according to an embodiment of the present disclosure.

The protocol layers of the UE 300 include an application layer 710, a Transmission Control Protocol/User Datagram Protocol (TCP/UDP) layer 720, Internet Protocol (IP) layer 730, and radio module layer 740. The radio module layer 410 includes a Packet Data Convergence Protocol (PDCP) layer 741, a Radio Link Control (RLC) layer 742, a Media Access Control (MAC) layer 743, and a Physical (PHY) layer 744. The filter unit 310 is interposed between the IP layer 730 and the PDCP layer 741. The message of the application 380 deliver to the filter unit 310 through the application layer 710, the TCP/UDP layer 720, and the IP layer 730.

The filter unit 310 analyses the message and determines whether the message is of the registered application. For example, the filter 310 may check the message header, especially the destination IP address and message type. The message may be categorized differently depending on the characteristic of the application. If the received message is of the registered application, the filter unit 310 delivers the message to the message processing unit 340. Otherwise if the received message is not of the registered message, the filter unit 310 delivers the message to the radio module 740 for normal message processing.

The message processing unit 340 analyzes the received message to determine whether it is a control message. The control message may include the keepalive and/or periodic update check message. If the received message is not a control message but a user message, the message processing unit 340 sends the user message to the server message processing apparatus 410. If the received message is a control message, the message processing unit 340 processes the message for itself. That is, the message processing unit 430 may generate a virtual response message to the application or ignore the message.

In the case that the application is operating in the polling mode, when an update check message is received from the application, the message processor 340 generates a response notifying of not update to the application. However, if the update message is received from the server message processing apparatus 410, the message processing unit 340 retains this message and, when the update check message is received, delivers the update message to the corresponding message.

In the case that the application is operating in the push mode, when a connection maintenance message is received from the application, the message processing unit 340 ignores or replies in an appropriate manner such that the application makes sure of the connection with the application server. Actually, the session is alive between the application and the message processing unit 340. However, if an update message is received from the server message processing apparatus 410, the message processing unit 340 may deliver the update message to the application in the push mode.

According to this method, there is no need for the UE 300 to maintain the TCP session with the application server 250 or transmit the update check message periodically. This makes it possible to improve poser conservation by blocking power to the radio module 740. This makes it also possible to prevent the session maintenance and update check messages from being transmitted through the radio network redundantly, resulting in reduction of traffic load.

Figure 8:
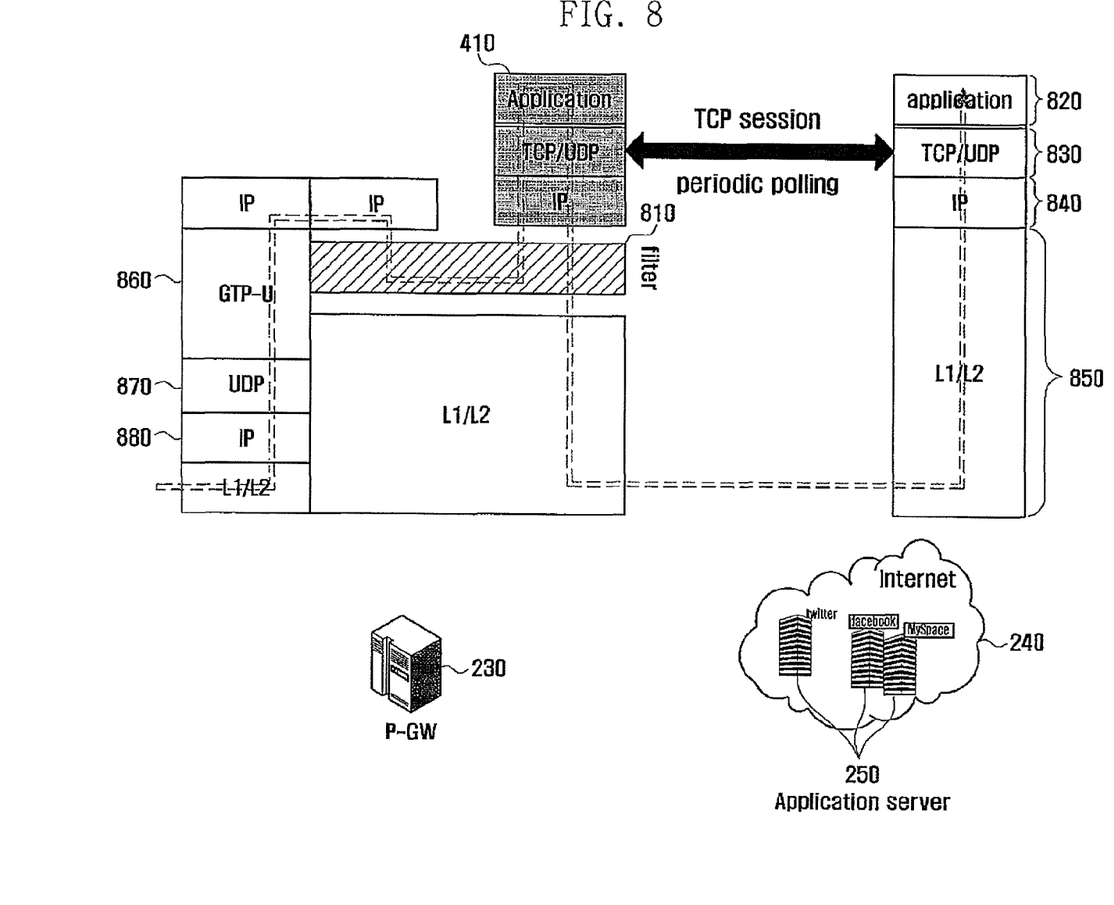
FIG. 8 is a diagram illustrating protocol stacks of the PGW 230 and application server 250 according to an embodiment of the present disclosure.

FIG. 8 is a diagram illustrating protocol stacks of the PGW 230 and application server 250 according to an embodiment of the present disclosure.

The user message or application execution/termination notification transmitted by the UE message processing apparatus 310 is delivered through the L1/L2 layer 850, IP layer 880, UDP layer 870, GPRS Tunneling Protocol User Plane (GTP-U) layer 860, and IP layer 840 in the PGW 230. This message is delivered to the L1/L2 layer again so as to be transmitted to the application server 250. Before the delivery to the L1/L2 layer, the filter 810 determines whether the message is of the registered application. The filter 810 may checks the header, specially the destination IP address and message type. The message may be categorized differently depending on the characteristic of the application. The message associated with the registered application is transferred to the message processing apparatus 410 while other message to the application server in the conventional manner.

The server message processing unit 410 manages the registered application according to the application execution/termination message. The server message processing apparatus 410 also modifies the received user message for identification of the application of the corresponding UE. Afterward, the server message processing apparatus 410 sends the application server 250 the modified user message.

The server message processing apparatus 410 may maintain the TCP session with the application server 250. For this purpose, the server message processing apparatus 410 may send the application server 250 a connection maintenance message associated with the registered application periodically. In this case, the server message processing apparatus 410 may receive the update message from the application server 250 in the push mode. If the update message is received, the server message processing apparatus 410 may forward the update message to the UE message processing apparatus 310.

According to an alternative embodiment, the server message processing apparatus 410 may send the application server 250 the update check message periodically. In this case, the server message processing apparatus 410 may receive the update message from the application server 250 in response to the update check message. If the update message is received, the server message processing apparatus 410 may forward the update message to the UE message processing apparatus 310.

In any case, the server message processing apparatus 410 sends the application server 250 the control message (update check message or connection maintenance message) periodically. However, since the PGW 230 and the application server 240 are connected through a wire, the traffic restriction is low as compared to the radio communication network. Also, since the server message processing apparatus 410 is positioned at the PGW 230 within the cellular network, it is possible to transmit a message to the terminal without difficulty when there is any update although there is no constant session.

Figure 9:
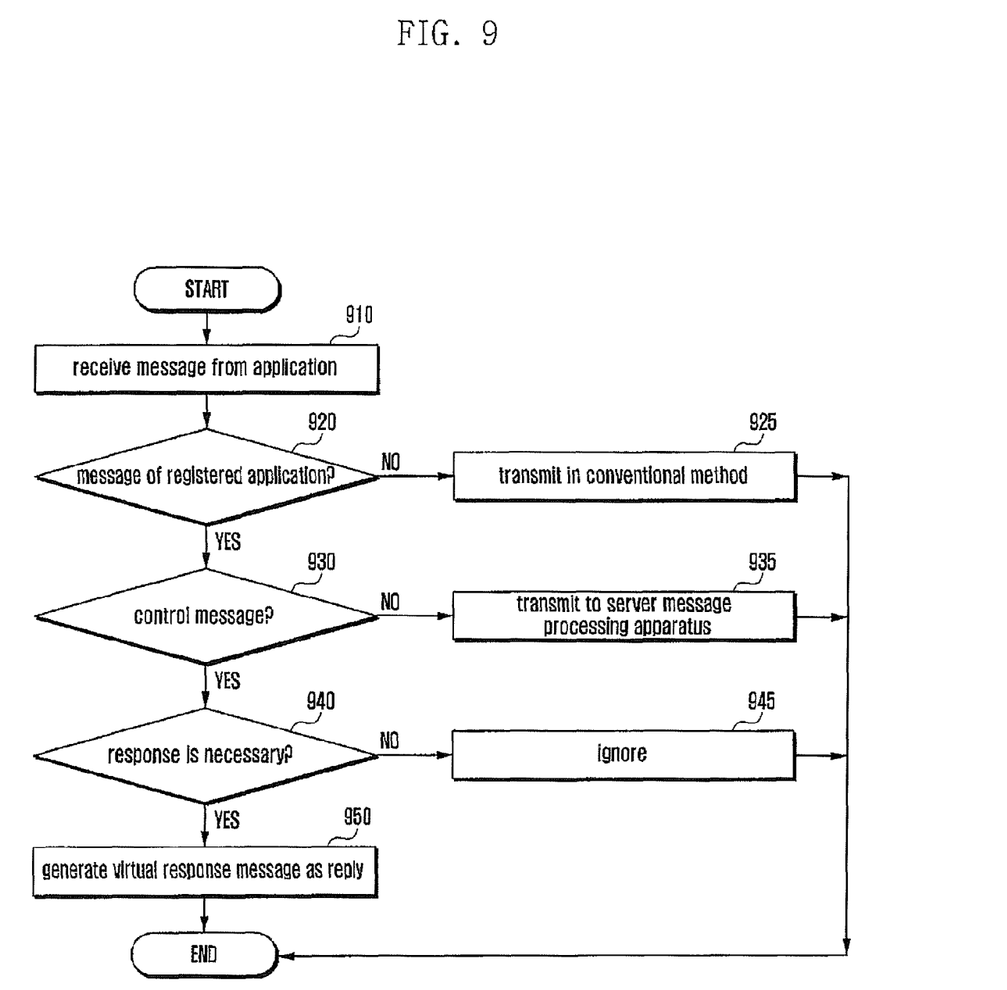
FIG. 9 is a flowchart illustrating the message handling procedure of the UE message processing apparatus 310 according to an embodiment of the present disclosure.

FIG. 9 is a flowchart illustrating the message handling procedure of the UE message processing apparatus 310 according to an embodiment of the present disclosure.

The UE message processing apparatus 310 receives a message from an application at operation 910.

The UE message processing apparatus 310 determines whether the received message is of the registered application at operation 920. If the received message is not of the registered application, the procedure goes to operation 925 for conventional message transmission. Otherwise if the received message is of the registered application, the procedure goes to operation 930.

The UE message processing apparatus 310 determines whether the received message is a control message at operation 930. If the received message is not a control message, the UE message processing apparatus 310 transmits the message to the server message processing apparatus. If the received message is the control message, the procedure goes to operation 940.

The UE message processing apparatus 310 determines whether it is necessary to reply in response to the received message at operation 940. For example, if the received message is the connection maintenance message requiring not reply, the UE message processing apparatus 310 ignores the received message at operation 945. If the received message is the update check message requiring a reply, the UE message processing apparatus 310 generates a virtual response message notifying of not update to the application at operation 950. Of course, if there is any update message received previously from the server message processing apparatus 410, the UE message processing apparatus 310 sends the update message to the application. However, the update message has to be delivered to the application in the format recognized by the application as if the update message is received form the application server 250 directly.

Figure 10:
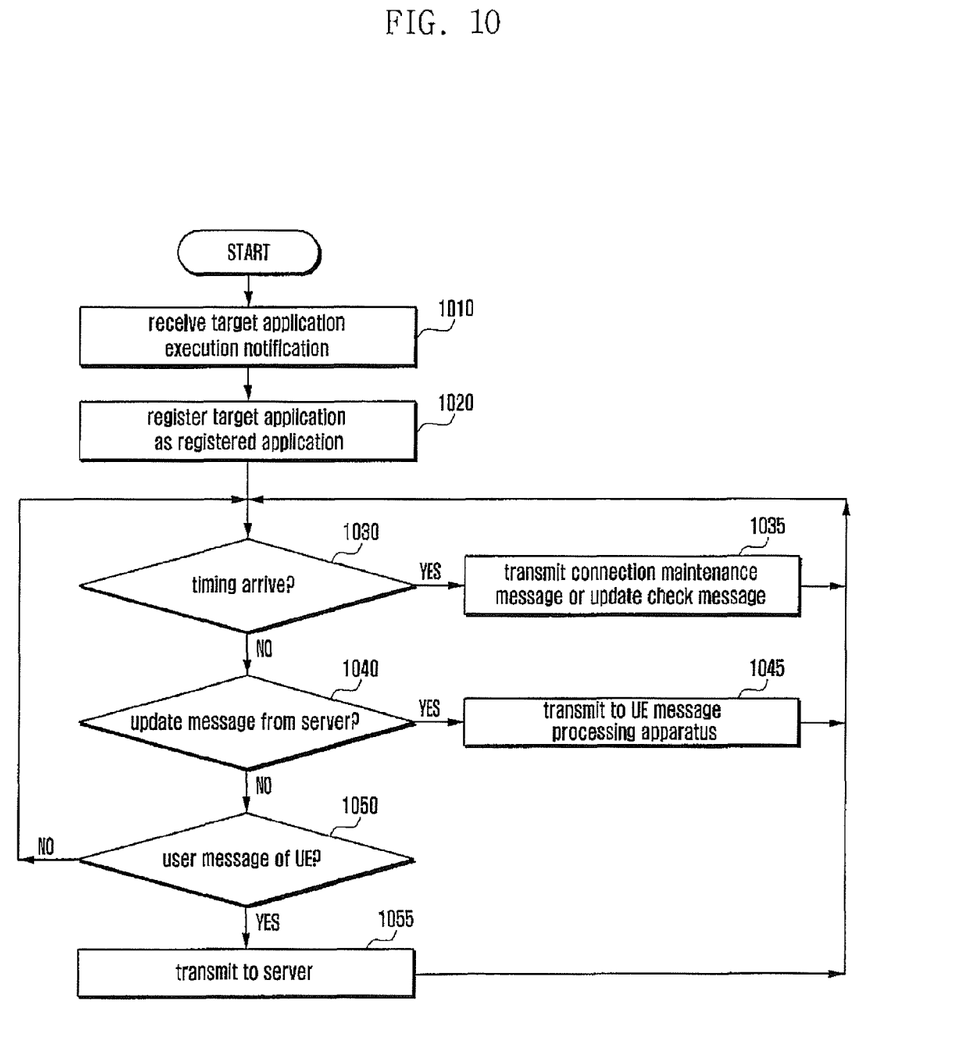
FIG. 10 is flowchart illustrating the message handling procedure of the server message processing apparatus 410 according to an embodiment of the present disclosure.

FIG. 10 is flowchart illustrating the message handling procedure of the server message processing apparatus 410 according to an embodiment of the present disclosure.

The server message processing apparatus 410 receives a notification of notifying that the target application has been executed at operation 1010. The server message processing apparatus 410 registers the notified application as a registered application at operation 1020.

The server message processing apparatus 410 determines whether it is the time of transmitting the connection maintenance message or update check message at operation 1030. If it is the time of transmitting the message, the server message processing apparatus 410 sends the application server 250 the connection maintenance message or update check message of which header is modified as if the message has been transmitted by the application at operation 1030.

If it is not the time of transmitting the message, the server message processing apparatus 410 determines whether an update message associated with the registered application is received from the serer message processing apparatus 410 at operation 1040. Regardless of whether the operation mode is the polling or pushing mode, the server message processing apparatus 410 is capable of receiving the update message associated with the registration application promptly from the application server 250. If the update message associated with the registered application, the server message processing apparatus 410 transmits the received update message to the UE message processing apparatus 310 at operation 1045. The UE message processing apparatus 310 delivers the message to the application. If no update message is received, the procedure goes to operation 1050.

The server message processing apparatus 410 determines whether a user message associated with the registered application is received from the UE at operation 1050. The server message processing apparatus 410 may receive the user message from the UE message processing apparatus 310. If the user message of the UE is received, the server message processing apparatus 410 forwards the user message to the corresponding application server at operation 1055. However, the user message of the UE has to be modified in header as if the user message is transmitted from the UE to the application server 250.

That is, the server message processing apparatus 410 transmits a control message (connection maintenance message or update check message) periodically to the application server corresponding to the registered application and relays messages between the application server 250 and the UE message processing apparatus 310.

In the above message processing procedure, the message may be categorized by analyzing the header. The message may be categorized differently depending on the type of the application.

According to embodiments of the present disclosure, it is possible to reduce the control message traffic generated by UE applications in the radio network and increase the idle time of the radio module, resulting in reducing radio network traffic load and battery consumption. According to embodiments of the present disclosure, the UE message processing apparatus and the server message processing apparatus 410 are capable of working without modification of applications.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The UE according to an embodiment of the present disclosure may be a portable electronic device such as mobile phone, Personal Digital Assistant (PDA), navigator, digital broadcast receiver, and Portable Multimedia Player (PMP).

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

Although exemplary embodiments of the present disclosure have been described in detail hereinabove with specific terminology, this is for the purpose of describing particular embodiments only and not intended to be limiting of the disclosure. While particular embodiments of the present disclosure have been illustrated and described, it would be obvious to those skilled in the art that various other changes and modifications can be made without departing from the spirit and scope of the disclosure.

The invention claimed is:

1. A message processing method of a terminal, the method comprising:
  receiving a notification of execution of a predetermined target application from an application manager of the terminal;
  registering the executed target application as a registered application;
  receiving a message, generated by the registered application, from the registered application of the terminal;
  determining whether the message is a control message independent of a user input or a user message depending on the user input;
  if the message is the control message, ignoring the message or transmitting a virtual response message to the registered application; and
  if the message is the user message, transmitting the message to a server message processing apparatus.

2. The method of claim 1, further comprising:
  receiving a server message from the server message processing apparatus; and
  transmitting the server message to the registered application.

3. The method of claim 1, further comprising:
  transmitting the execution notification to the server message processing apparatus.

4. A terminal comprising:
  an interface unit configured to:
  receive a notification of execution of a predetermined target application from an application manager of the terminal;
  register the executed target application as a registered application; and
  receive a message, generated by the registered application, from the registered application of the terminal;
  a filter unit configured to:
    determine whether the message is a control message independent of a user input or a user message depending on the user input; and
  a message processing unit configured to:
    ignore the message or transmit a virtual response message to the registered application, if the message is the control message; and
    transmit the message to a server message processing apparatus, if the message is the user message.

5. The terminal of claim 4, wherein the message processing unit is configured to receive a server message from the server message processing apparatus and transmit the server message to the registered application.

6. The terminal of claim 4, wherein the interface unit is configured to transmit the execution notification to the server message processing apparatus.

* * * * *